United States Patent [19]

Fürst et al.

[11] Patent Number: 5,542,735
[45] Date of Patent: Aug. 6, 1996

[54] LENGTHWISE MOVABLE VEHICLE ROOF

[75] Inventors: Arpad Fürst, Germering; Martin Danzl, München; Johann Mayer, Petershausen; Stefan Miklosi, München, all of Germany

[73] Assignee: Webasto Karosseriesysteme GmbH, Germany

[21] Appl. No.: 286,468

[22] Filed: Aug. 5, 1994

[30] Foreign Application Priority Data

Aug. 5, 1993 [DE] Germany .................. 43 26 255.4

[51] Int. Cl.⁶ ........................................ B60J 7/08
[52] U.S. Cl. .................. 296/107; 296/116; 296/146.14; 296/220
[58] Field of Search ...................... 296/107, 116, 296/108, 216, 220, 136, 146.14, 146.16, 147

[56] References Cited

U.S. PATENT DOCUMENTS

| | | | |
|---|---|---|---|
| 3,180,677 | 4/1965 | Scott | 296/107 |
| 4,844,534 | 7/1989 | Boots | 296/216 X |
| 5,209,544 | 5/1993 | Benedetto et al. | 296/107 |
| 5,429,409 | 7/1995 | Corder et al. | 296/108 |

FOREIGN PATENT DOCUMENTS

| | | | |
|---|---|---|---|
| 2694245 | 2/1994 | France | 296/107 |
| 3903358 | 8/1990 | Germany | 296/108 |
| 2240519 | 8/1991 | United Kingdom | 296/220 |

Primary Examiner—David M. Mitchell
Assistant Examiner—Kia M. Robinson
Attorney, Agent, or Firm—Sixbey, Friedman, Leedom & Ferguson, P.C.; David S. Safran

[57] ABSTRACT

A vehicle roof with at least one roof cover part that can be opened during driving in the manner of a sunroof by being moved into at least one open position on guideways arranged in roof parts lying laterally to it in the lengthwise direction of the vehicle. A rear roof part that is stationary, at least during this sunroof mode of operation, is fixed with the lateral roof parts and can be moved with them and the cover part into a storage space in the rear part of the vehicle to expose a convertible-type roof opening. Supporting B-columns are movable in the lengthwise direction of the vehicle, and the rear roof part is mounted to them in a pivotable manner. By pivoting the rear roof part and subsequent pivoting of the B-columns, only a very small storage space is required between the seats and the rear axle for stowage of the roof.

7 Claims, 13 Drawing Sheets

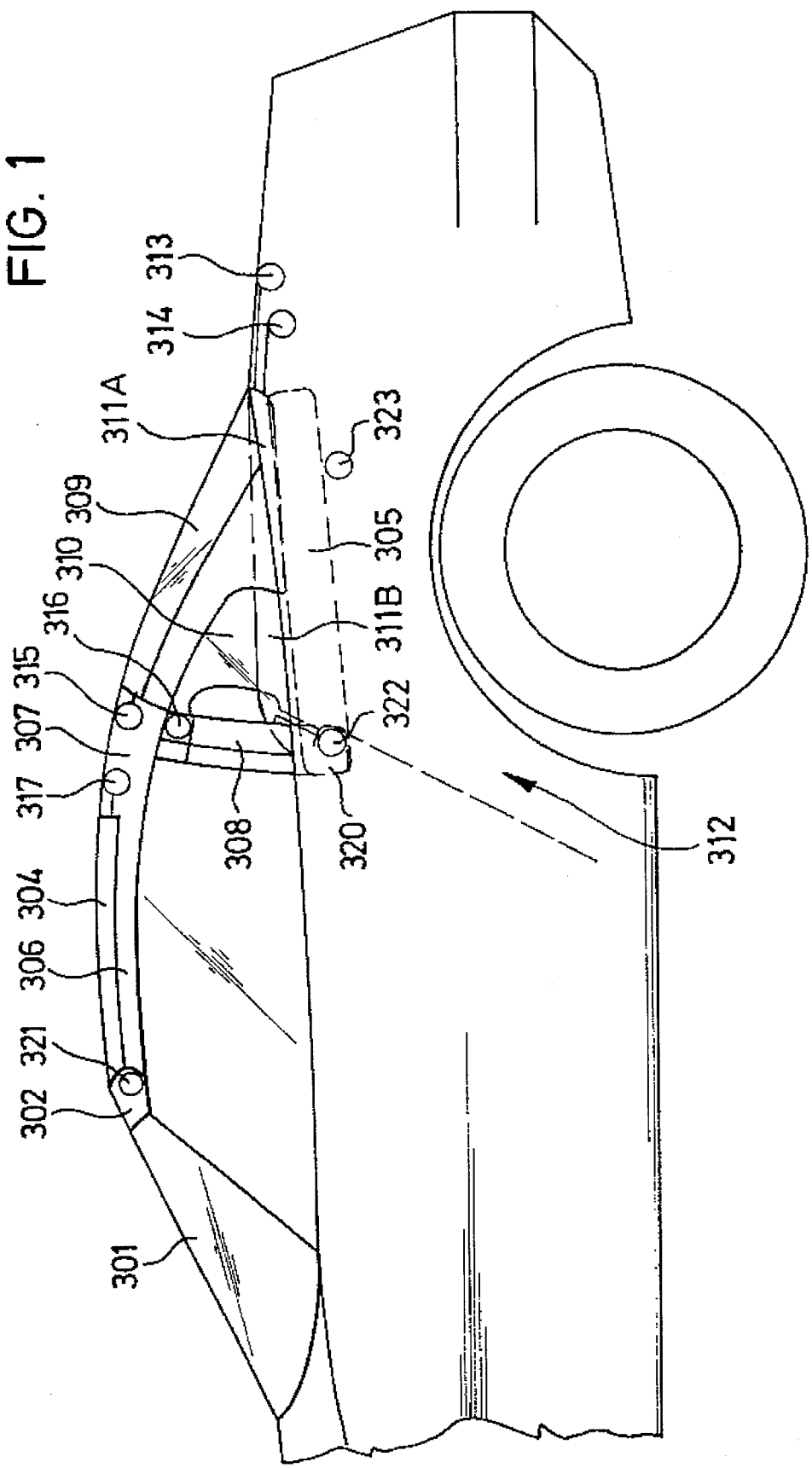

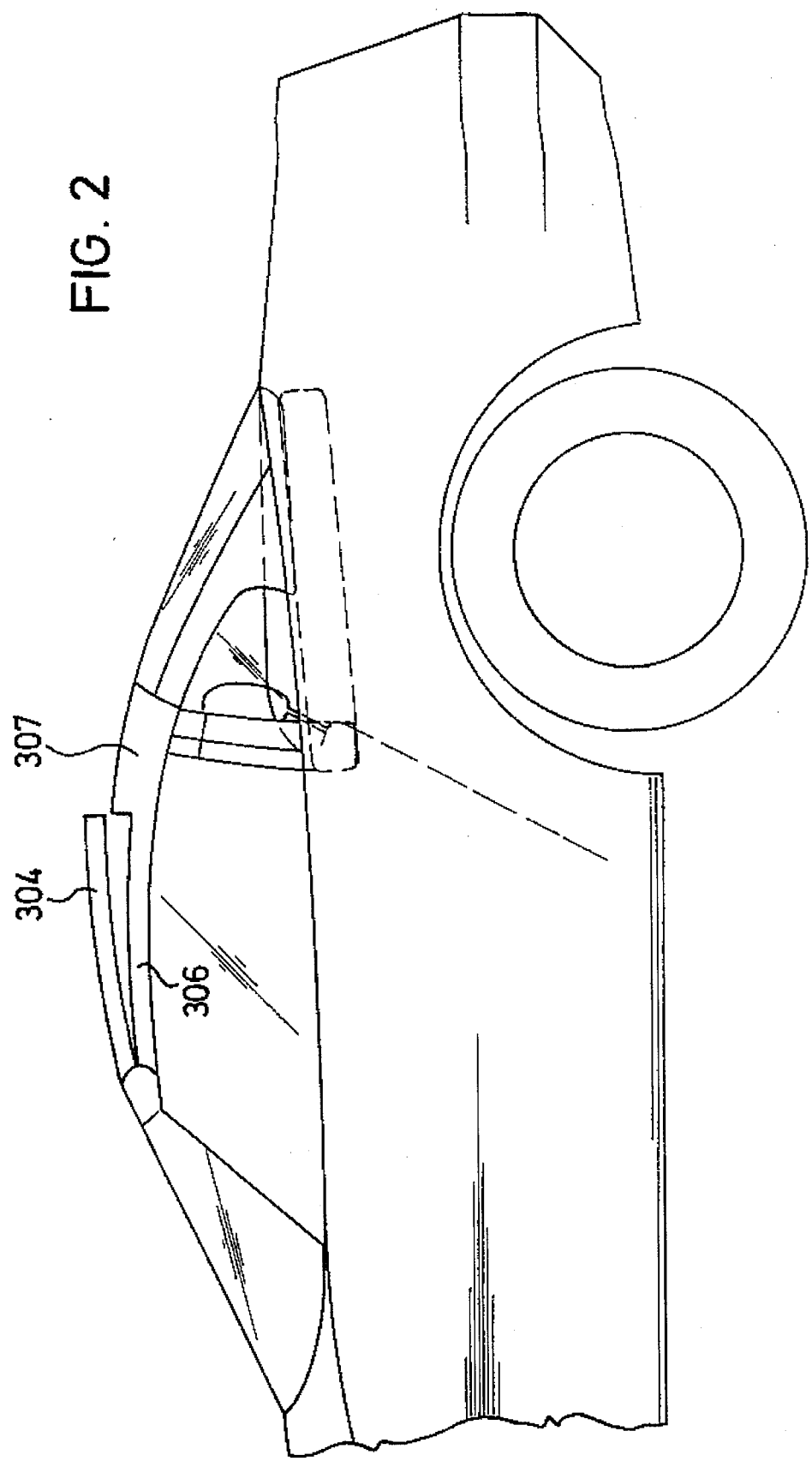

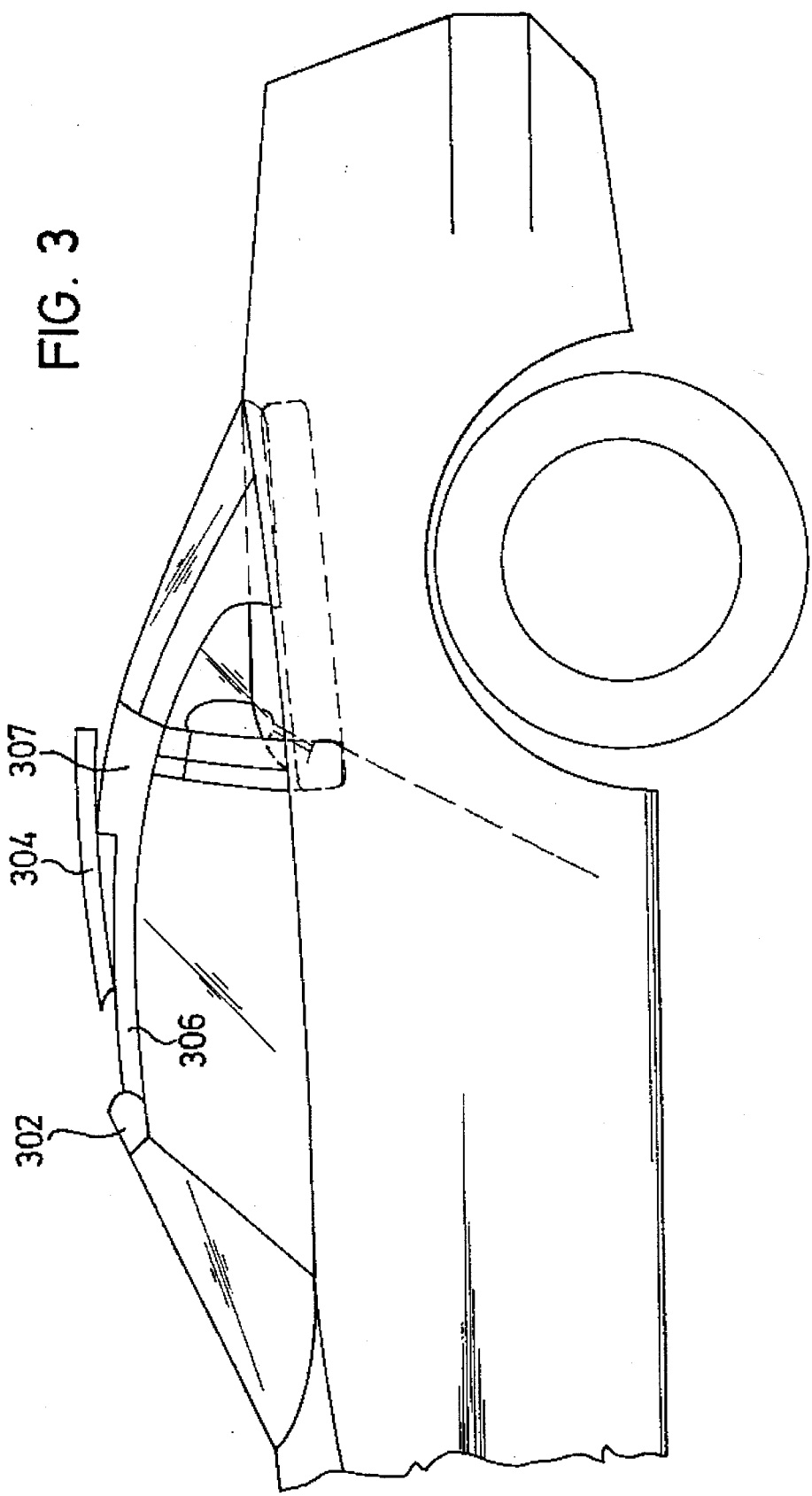

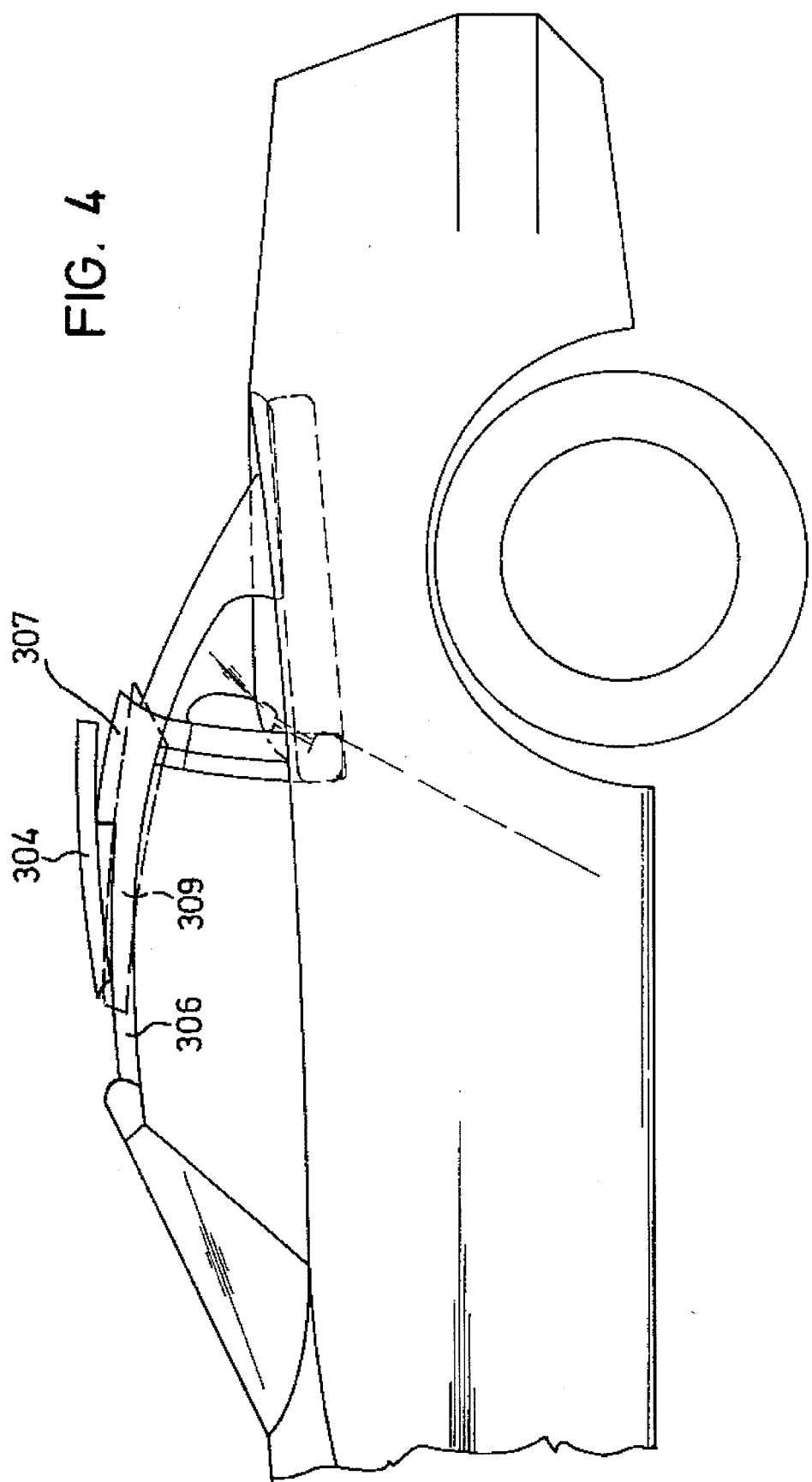

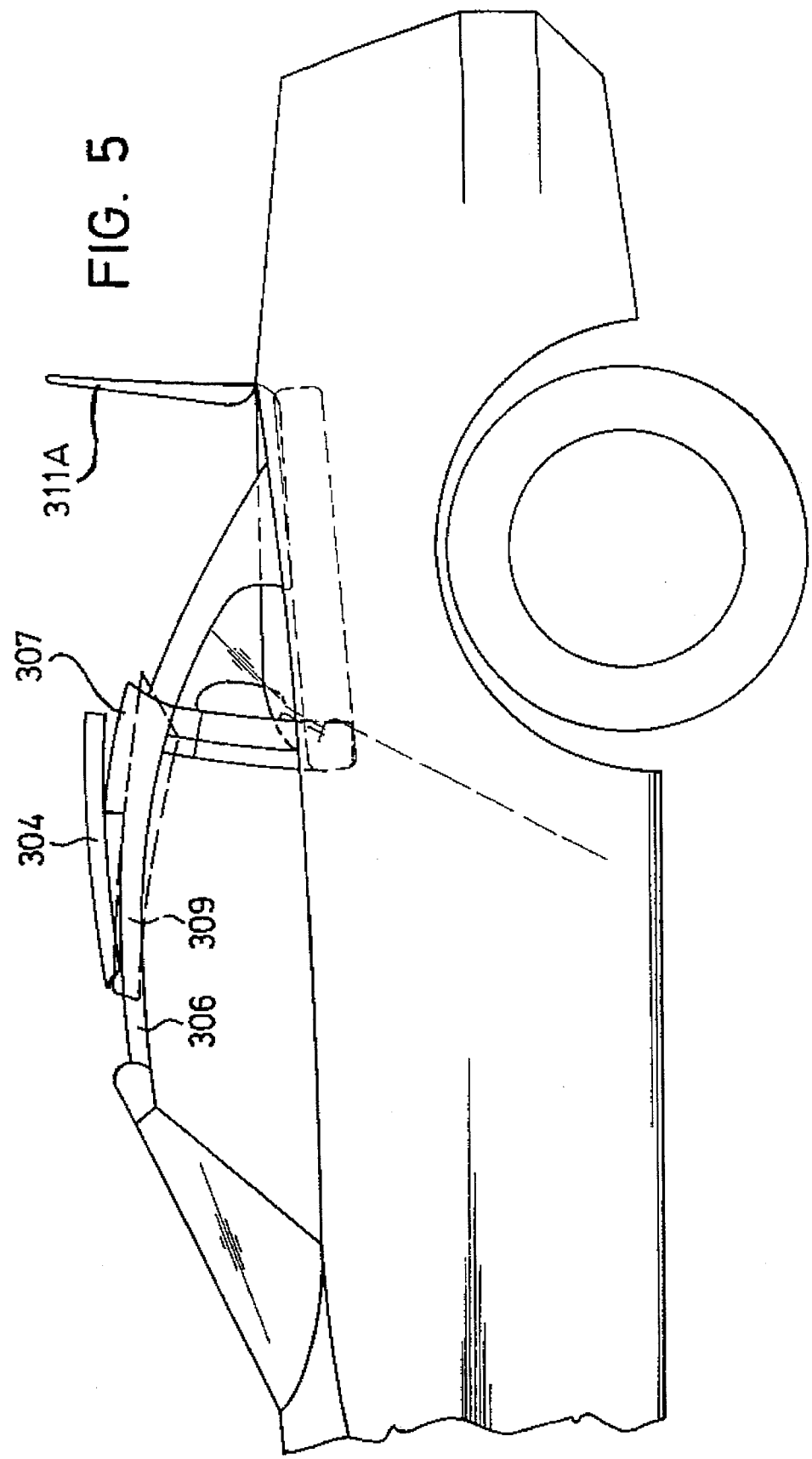

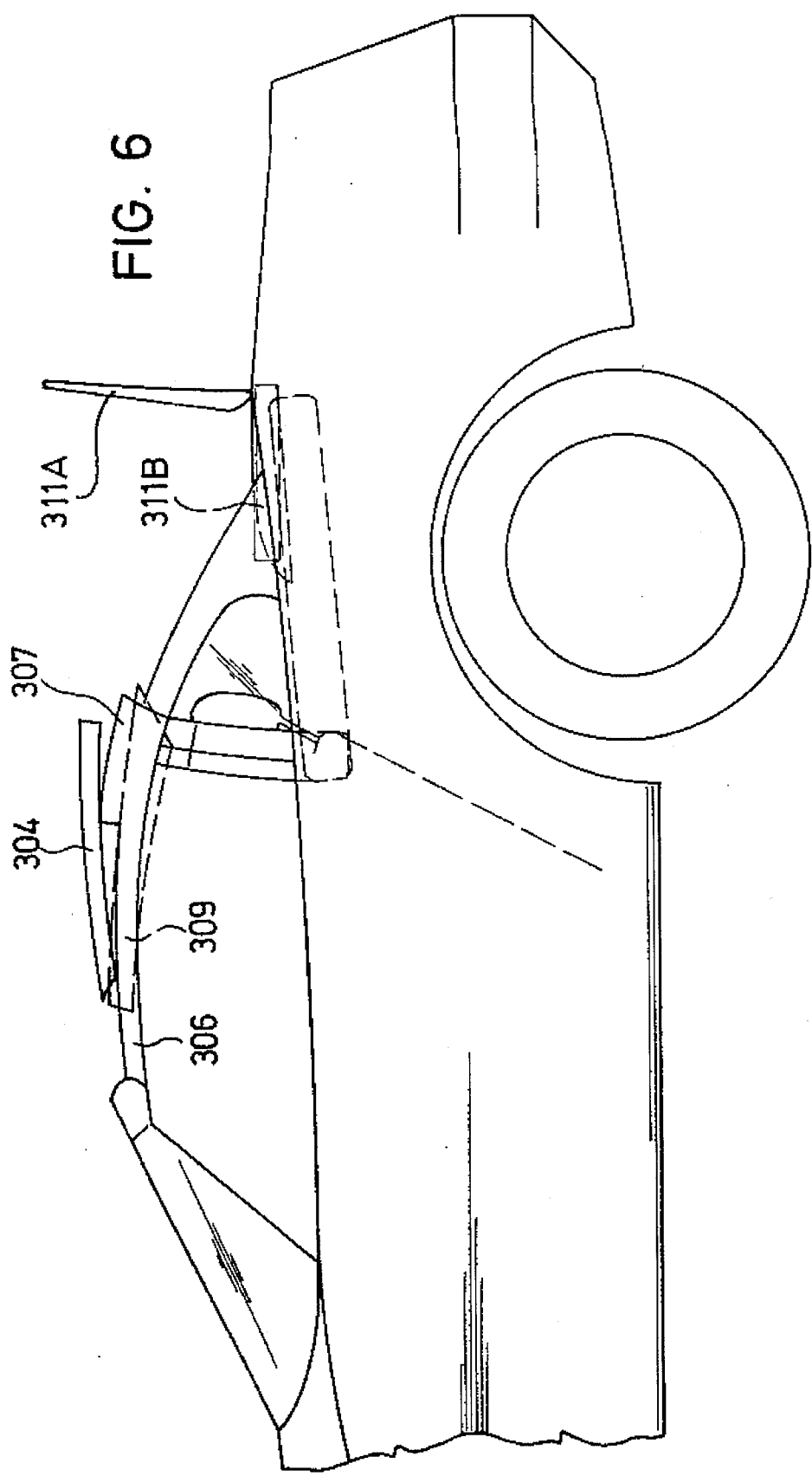

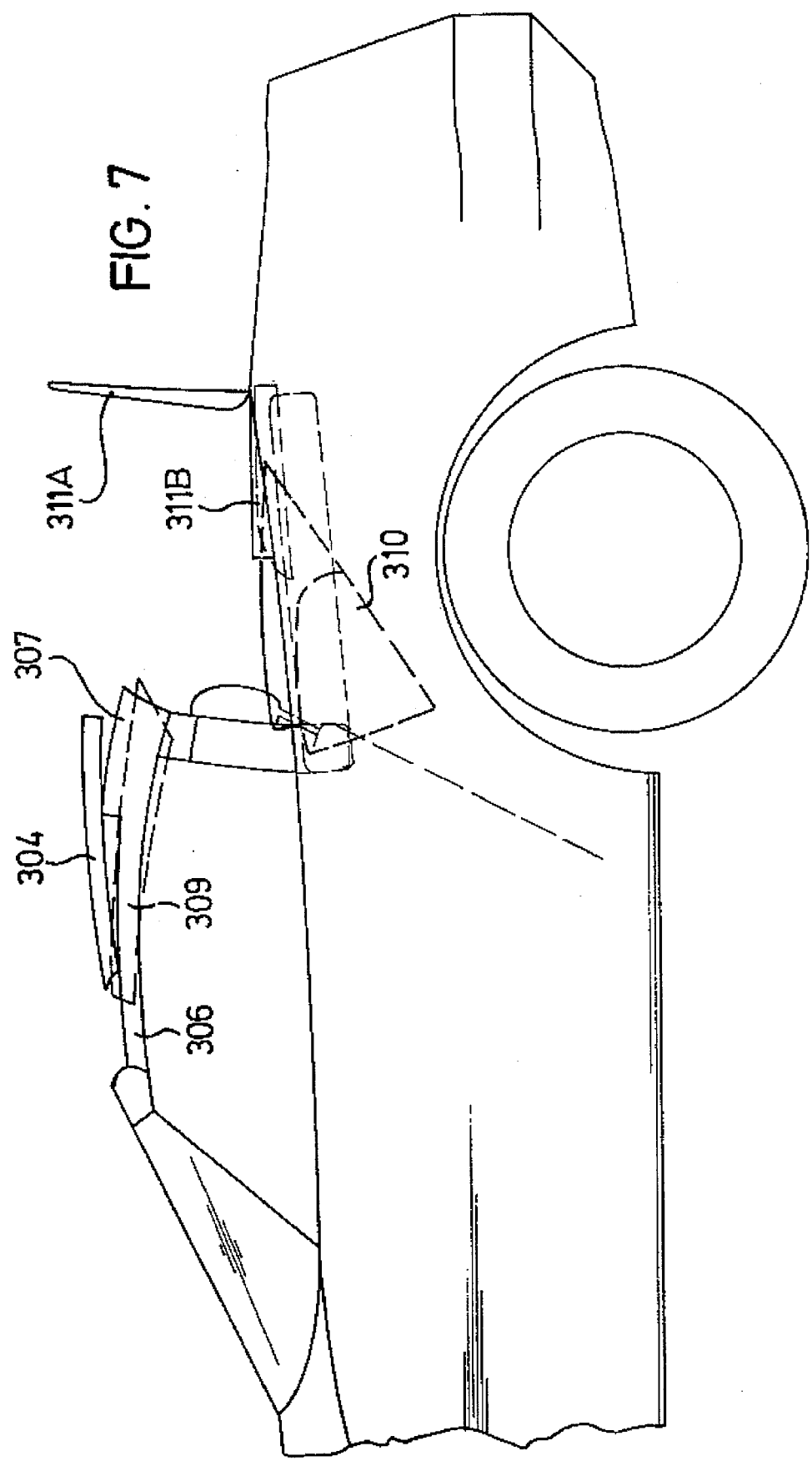

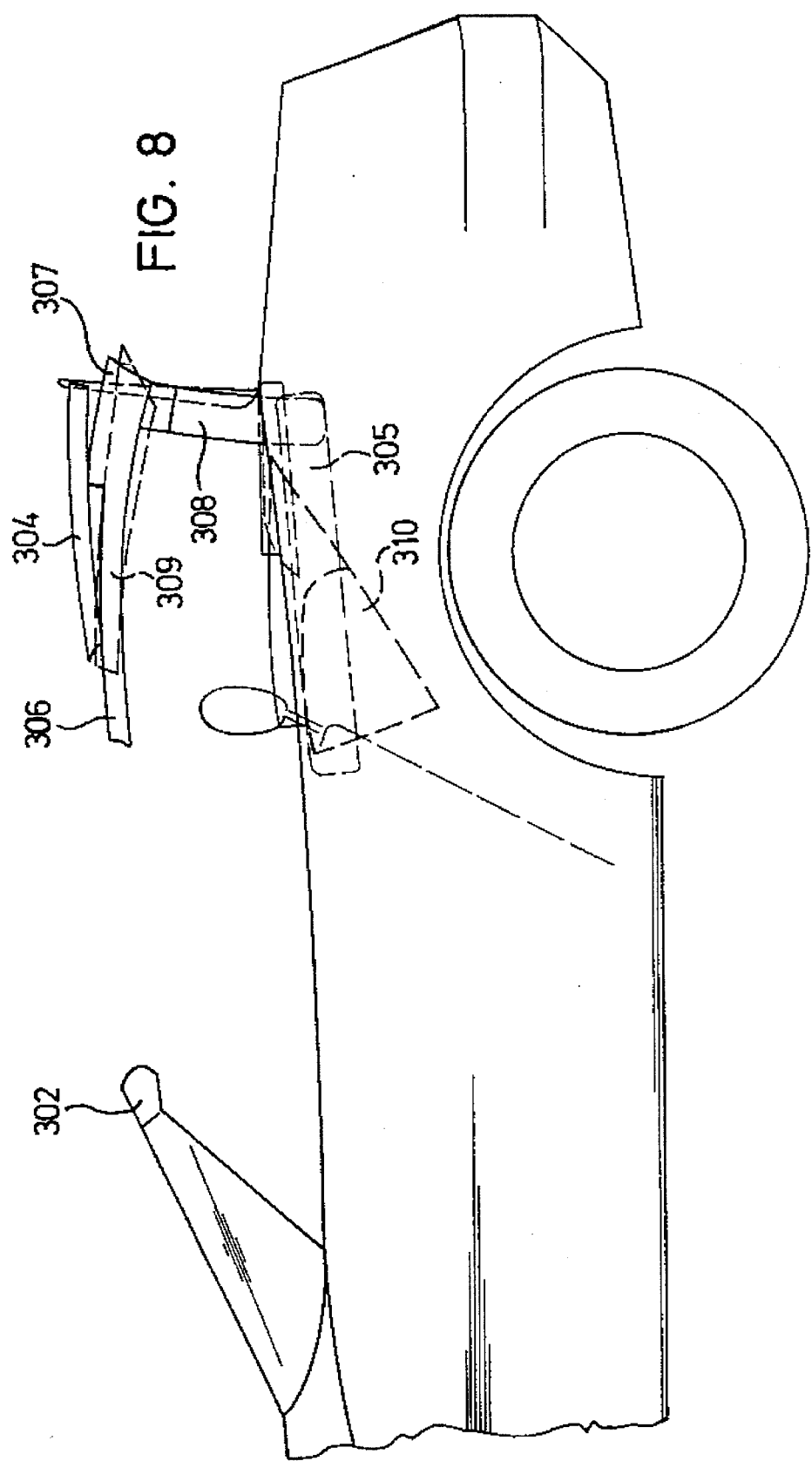

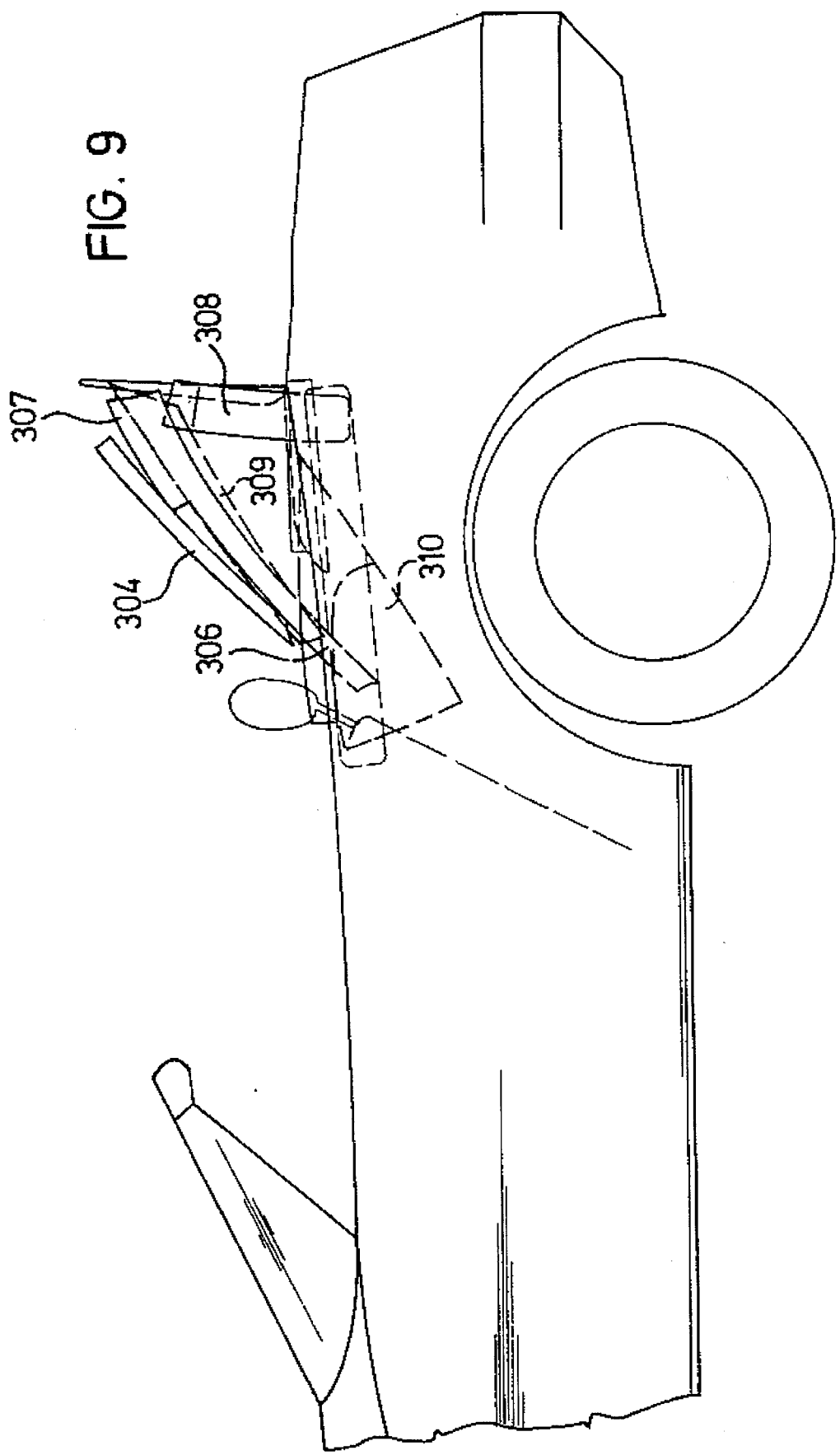

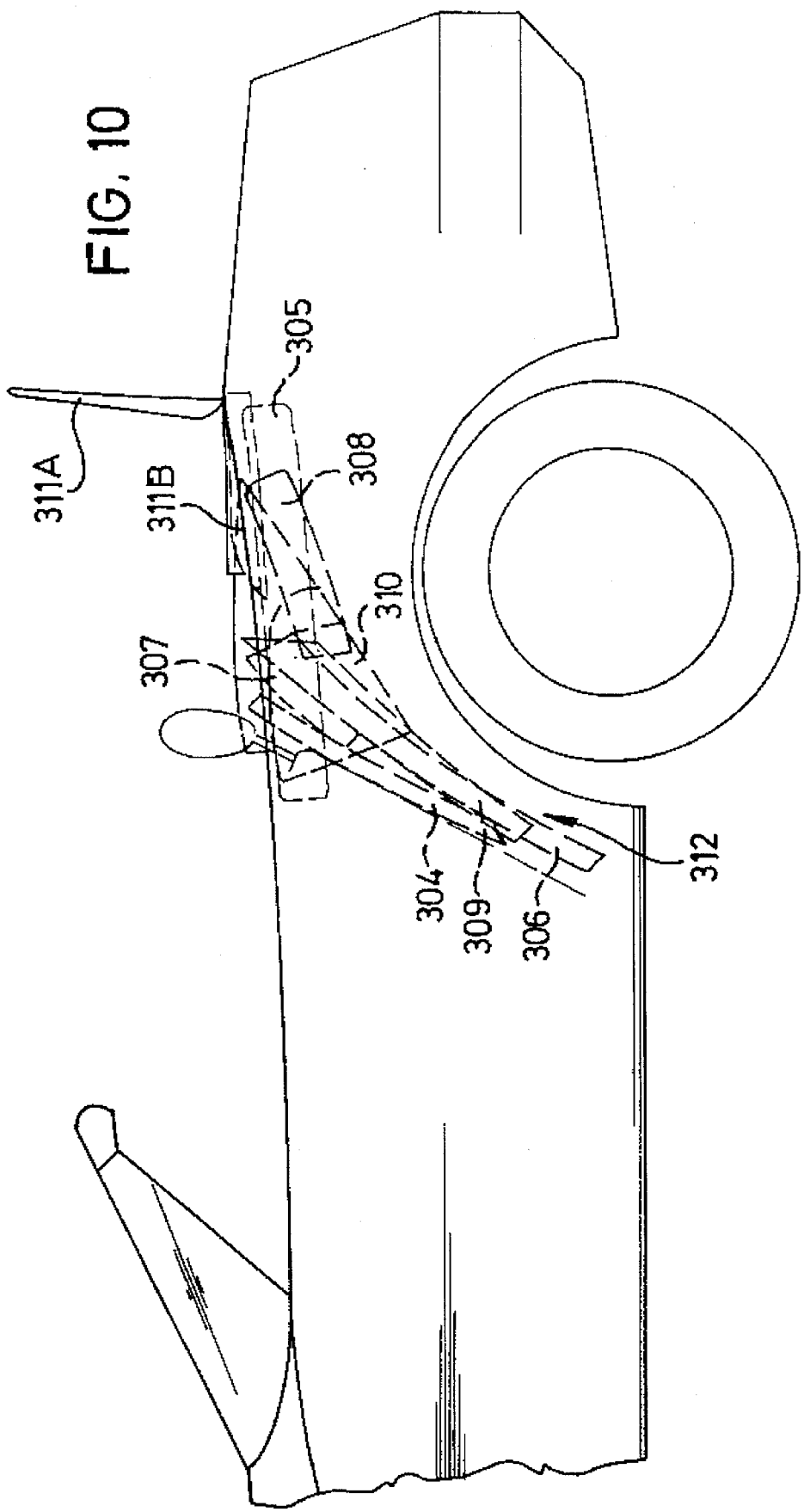

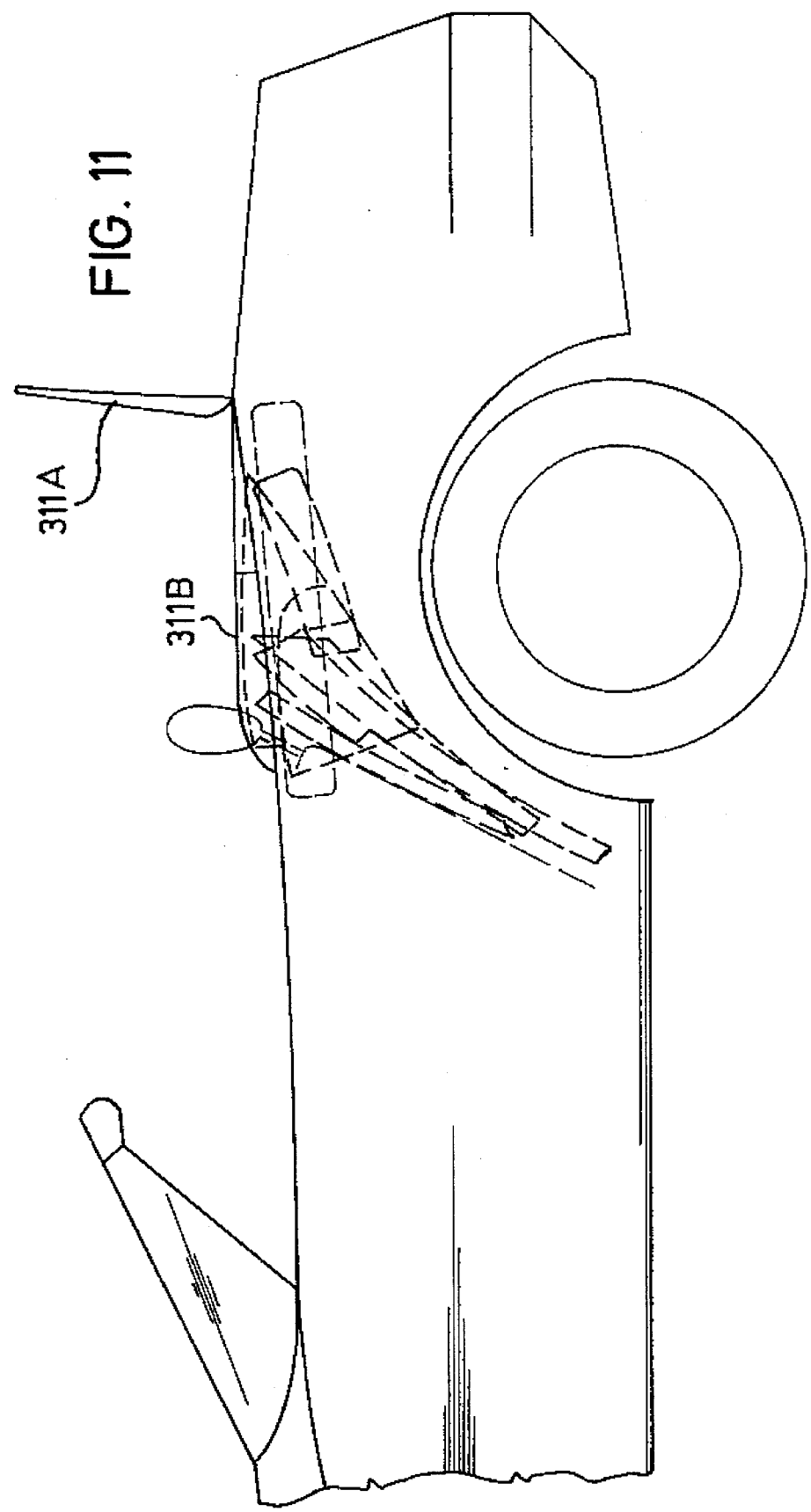

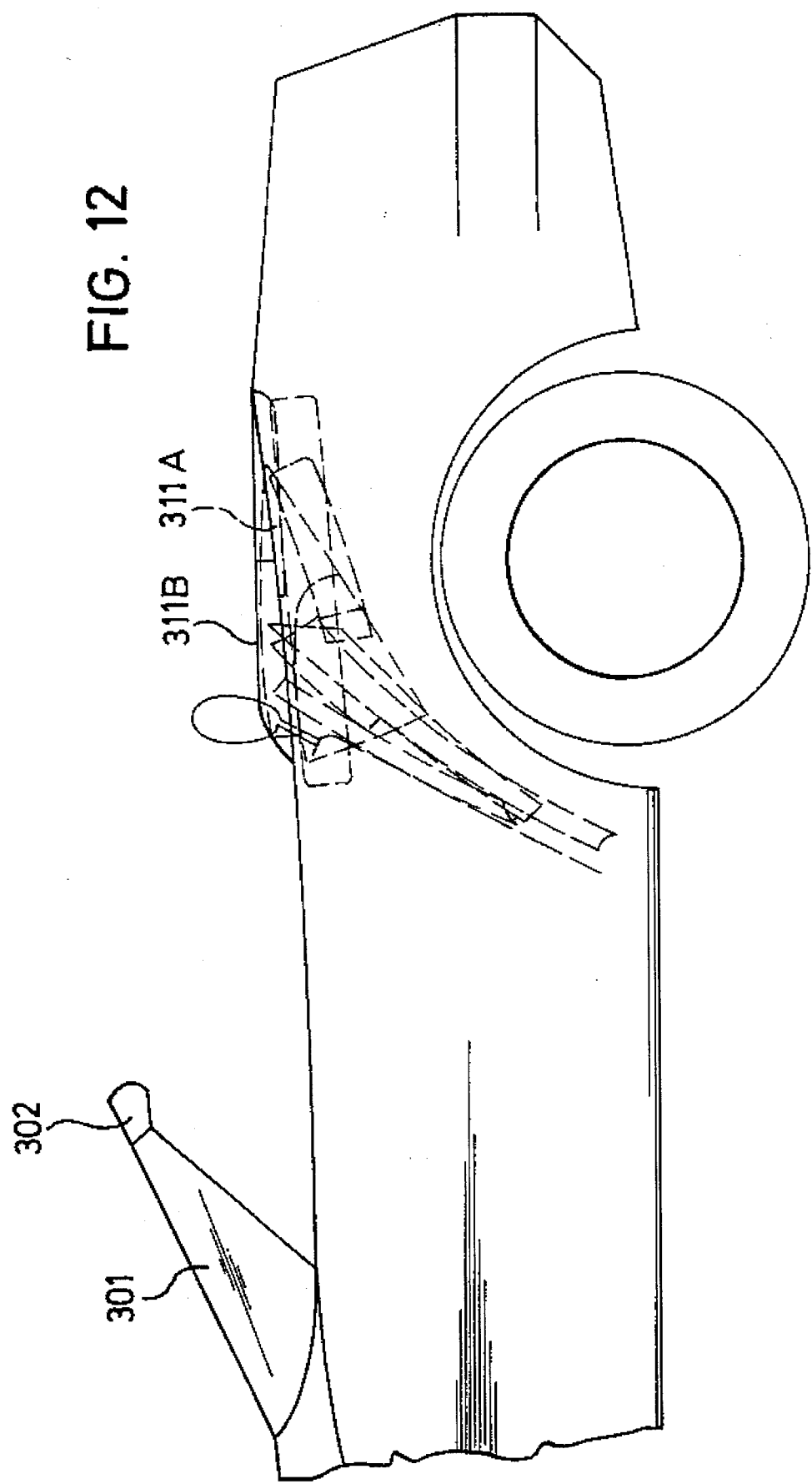

LENGTHWISE MOVABLE VEHICLE ROOF

BACKGROUND OF THE INVENTION

1. Field of the Invention

The invention relates to a vehicle roof with at least one roof part that can be opened during driving in the manner of a sunroof and which can also be opened in the manner of a convertible with the roof parts being shifted into a compact form and moved into a storage space in the rear part of the vehicle.

2. Description of Related Art

In co-pending U.S. patent application Ser. No. 08/286,467 which is a continuation-in-part of U.S. patent application Ser. No. 08/014,991 now abandoned, a roof of the above-mentioned type is described in which the lateral roof parts, after complete opening of the roof part that can be opened, are swung on the rear roof part that is stationary during the sunroof mode of use, and together with this rear roof part are lowered by a swinging movement of the columns supporting the roof part into a storage space in the rear part of the vehicle. Separate drives are necessary to fold the lateral roof parts, and a part of the trunk compartment must be used as the storage space.

SUMMARY OF THE INVENTION

The object of this invention is to provide a vehicle roof that will achieve the advantages of the roof of the above-noted application without its disadvantages.

According to the invention, this object is achieved in that the roof pan that is stationary in the sunroof mode of operation is a rear roof part, and is mounted in a pivotable manner opposite lateral B-columns supporting it, these B-columns being movable lengthwise on approximately horizontal guideways integral with the car body and are also mounted in a pivotable manner. It is possible by such a mechanism to move the roof part that is stationary in the sunroof mode of operation, first with the B-columns supporting it toward the rear, to pivot the movable roof part downward onto them there, and then, to stow it, together with the B-columns, by a pivoting movement into a storage space in front of the rear axle.

It is advantageous for such a vehicle roof if the roof part that can be opened in the sunroof mode of operation is formed by a cover of a spoiler roof, which is located above the rear roof part that is stationary during this mode of operation when the cover is in a fully open position.

It is further advantageous that a rear window can be moved by a drive under the rear roof part that is stationary in the sunroof mode for complete opening.

Since no folding of the lateral roof parts onto the rear roof part is necessary, the lateral roof parts can advantageously form a subassembly with the rear roof part that is stationary in the sunroof mode of operation. From the space conditions necessary for the pivoting of the roof part that is stationary in the sunroof mode to the supporting B-columns, it is advantageous if this pivoting takes place with supporting B-columns moved back and only then the roof part that is stationary in the sunroof mode and the B-columns together are pivoted into the storage space. By this sequence, the pivoting of the roof takes place in a space that does not adversely affect the headroom of the passengers, so that the conversion to a convertible-like vehicle with a completely lowered roof during driving can take place.

It is further advantageous if triangular windows with a frame part fastened to their upper edge are arranged between the rear window and the B-columns. These triangular windows can be lowered on both outer sides of the storage space.

Finally, it is advantageous if the storage space can be closed by at least one covering from above.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 is diagrammatic side view of a closed vehicle roof with all drives;

FIG. 2 is a vehicle roof with pushed-out spoiler cover;

FIG. 3 is the vehicle roof with moved-back spoiler cover;

FIG. 4 is the vehicle roof with rear window moved under a rear roof part;

FIG. 5 is the vehicle roof with open folding top flap;

FIG. 6 is the vehicle roof with an open coveting;

FIG. 7 is the vehicle roof with lowered triangular windows;

FIG. 8 is the vehicle roof with the B-columns retracted;

FIG. 9 is the vehicle roof with the rear roof part pivoted;

FIG. 10 is the vehicle roof with the B-column swung into the storage space;

FIG. 11 the vehicle roof with the covering closed; and

FIG. 12 is a completely open and stowed vehicle roof with the folding top flap closed.

DETAILED DESCRIPTION OF THE PREFERRED EMBODIMENT

Figure 8A:
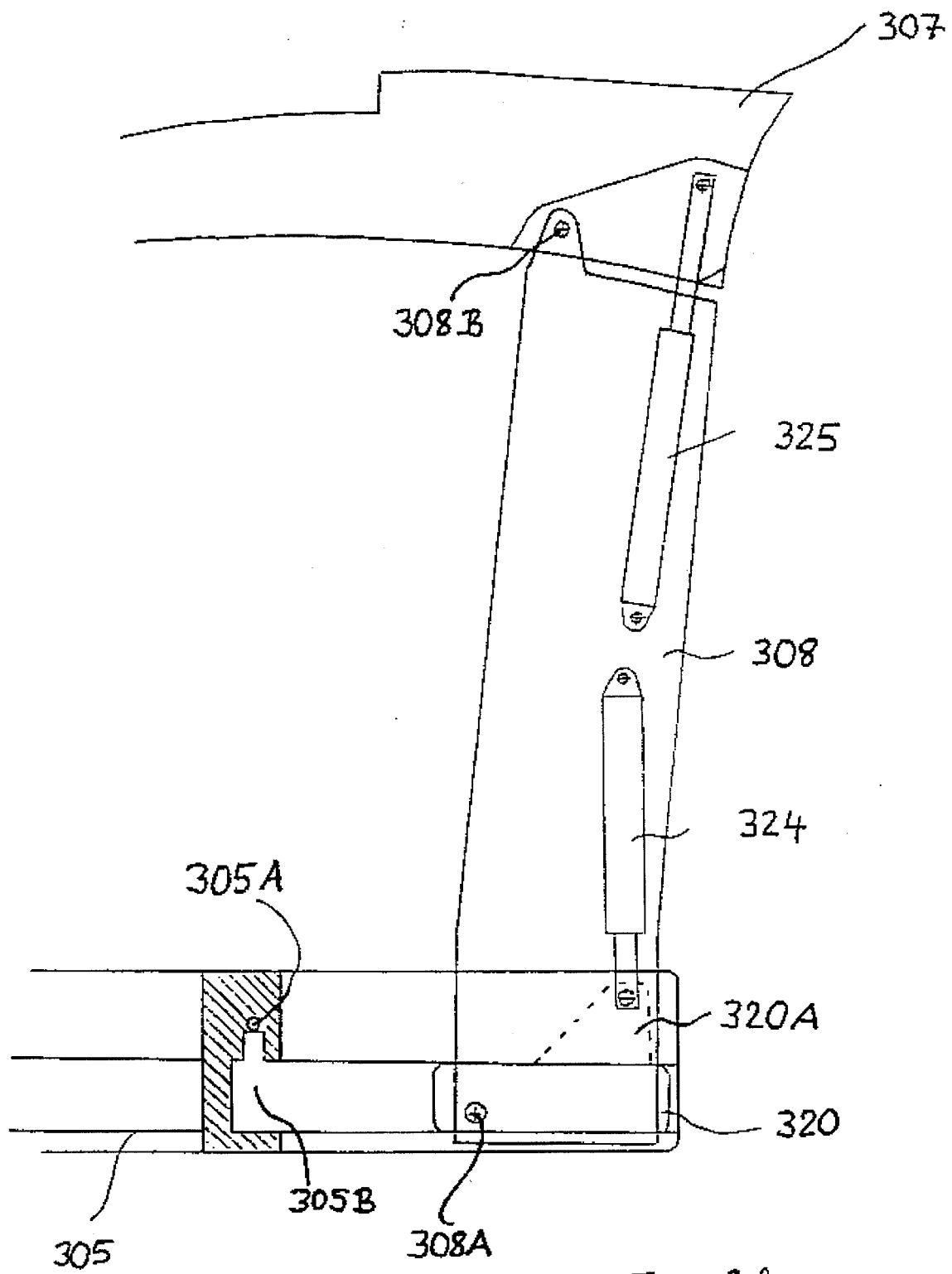
FIG. 8A shows the B-column structure and related drives of FIG. 8.

In the vehicle diagrammatically represented in FIG. 1, a front transverse spar 302 adjoins a windshield 301 on top. Lateral roof parts extend from the front transverse spar to both sides of a roof part (cover) 304 that can be opened. Parts 306 form a subassembly with a rear roof part 307 that lies behind the cover 304 in closed position thereof and which is stationary when the roof is arranged for a sunroof mode of operation (hereafter, the sunroof mode), by which it is meant at all times except when the roof is to be used in a stored, convertible mode. Rear roof part 307 is mounted on two B-columns 308 in a pivotable manner, and columns 308 have sliding elements 320 (FIG. 8A) which are movable along the length of longitudinal guideways 305 which are fixed to the car body and run approximately horizontally over the rear axle in the longitudinal direction of the vehicle. The mounting of B-column 308 to sliders 320 also enables pivoting of the B-columns 308 relative to guideways 305.

A rear window 309 rearwardly adjoins rear roof part 307. Triangular windows 310 are laterally arranged between the rear window 309 and the B-columns 308, these windows being provided with a stationary frame part on their rear edge adjacent to rear window 309. Storage space 312 lying approximately below rear window 309 is covered from above by a covering 311B, which extends between the triangular windows 310, as well as by a top hood 311A, which is U-shaped when viewed from above, engaging under triangular windows 310 and rear window 309.

For a complete conversion of the vehicle roof from the position shown in FIG. 1, through numerous intermediate stages to the convertible-type, completely open position of the vehicle roof represented in FIG. 12, numerous electric drives are provided, all of which are diagrammatically represented only in FIG. 1 for reasons of simplification of the drawing. In front transverse spar 302, electric drives 321 are provided on both sides, which operate a locking mechanism for tight connection of lateral roof parts 306 with front transverse spar 302 (which is described in detail in the above-mentioned co-pending application Ser. No. 08/286, 467, said application being hereby incorporated by reference for a full understanding of this locking mechanism). In the rear roof part, an electric drive 317 is provided, which is used for pushing out and subsequent moving toward the rear of cover 304, this drive and the related movement mechanisms and guides can be constructed in the manner of a conventional "spoiler" type sunroof. Further, a drive 315, which takes care of a displacement of rear window 309 (including a mounting frame thereof) under rear roof part 307, is located in rear roof part 307, this drive and the related movement mechanisms and guides being constructed in the manner of a conventional sliding type sunroof, initially lowering the front edge of the window 309 before retracting it into the rear roof part 307. In the upper part of the B-columns, drives 316 are provided, by which a pivoting of rear roof part 307 around B-columns 308 is made possible, one form for drive 316 being shown in FIG. 8A and is described below. In the lower part of the B-columns, drives 322 are provided which are used for moving the B-columns toward the rear along guideways 305 and in the rear position are pivotable forward into storage space 312. Two further drives 313 or 314 for an operation of covering 311B or top hood 311A lie on the upper front edge of the trunk below rear window 309. Finally, another drive 323 is provided for a lowering of triangular windows 310, and this drive and its related movement mechanisms and guides can be constructed in the manner of known power window lowering mechanisms.

In FIGS. 2 to 12, in each case, only the parts that are involved in the respective conversion step to the complete convertible have been provided with reference numbers. In FIG. 2, cover 304 is raised at its rear edge into a pushed-out position by drive 317 and a push-out mechanism, not represented, in a manner well known in the prior art. In this position, cover 304 exposes a ventilation gap between it and rear roof part 307 and lateral roof parts 306.

In FIG. 3, cover 304 has been moved by drive 317 along guideways, not represented, on lateral roof parts 306, into a retracted open position in which cover 304 extends toward the rear over the rear roof part 307. In this open position, an air vent is created between the front edge of the cover 304 and the front transverse spar 302. Up to this point, the vehicle roof resembles, externally and functionally, a conventional vehicle roof equipped with a spoiler type sunroof.

In FIG. 4, rear window 309, after pivoting so that its upper edge has been swung inward, the rear window 309 has been moved by drive 315 on guideways in rear roof part 307 under the rear roof part 307. Rear window 309 thus lies approximately under cover 304, which rises above rear roof part 307. In this intermediate position, the vehicle can be used with an excellent ventilation action. By the undiminished connection of lateral roof parts 306 with front transverse spar 302 and with the rigid B-columns 308 connected with the rear roof part 307, a closed rollover cage protects the passengers in the event of a rollover.

In FIG. 5, top hood 311A has been swung upward and toward the rear. In FIG. 6, in addition, covering 311B has been moved by drive 313 into a retracted position. In FIG. 7, two triangular windows 310 have been moved by drives 323 into a lowered position. To achieve the position represented in FIG. 8, the locking mechanisms between front transverse spar 302 and lateral roof parts 306 are first detached by drives 302, and then B-columns 308 are moved toward the rear by drives 322 along guideways 305 without changing their vertical position (a section of guideway 305 has been rotated 90° to show the channel 305A for the drive cable for displacing sliding element 320 and the channel 305B within which sliding element 320 is slidably guided). In this case, the B-columns 308 slave the entire package of lateral roof parts 306, rear roof part 307, cover 304 and rear window 309 with them to the rear into a position, where, as represented in FIG. 9, rear roof part 307 has been pivoted downward on B-columns 308 by hydraulic cylinder units 325 of drives 316 about a pivot point 308B (FIG. 8A) without adversely affecting the headroom of the passengers due to the front end of this package being at least as far rearward as the passenger seat headrests, as shown in FIG. 8).

For complete flush stowing of the roof package in the storage space 312, the angle between rear roof part 307 and B-columns 308 is simultaneously changed from the position represented in FIG. 9 to that in FIG. 10 by drives 316 and 322, by pivoting the B-columns 308 forward about pivot 308A via the hydraulic cylinder unit 324 of drives 316 and by moving them forward by a specific amount along guideways 305 via the drive cable of drive 322. In this case, the entire roof package requires minimal space in the lengthwise direction of the vehicle (having been placed in the longitudinally compacted configuration described above) and can be installed in storage space 312 between the seats and the rear axle without adversely affecting the actual trunk space. After moving the covering 311B forward by drive 313 (FIG. 11 ) and swinging down top hood 311A by drive 314, the entire vehicle roof is stored in storage space 312 and concealed from above by covering 311B and the top hood 311A. In the position represented in FIG. 12, the vehicle conveys the impression of a genuine convertible, which comprises only front transverse spar 302, lying above windshield 301, as a roll bar.

The changing back to a stationary vehicle roof with a spoiler cover that can be opened takes place exactly in reverse to the above-described sequence. The above-described vehicle roof represents a fixed vehicle roof provided with a cover that can be opened in the manner of a vehicle equipped solely with a sunroof, yet, it can be converted fully automatically in numerous intermediate steps to a convertible-type vehicle, while requiring an only very small storage space for roof when doing so.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. In a vehicle having a roof with at least one roof cover part that can be opened during driving in a sunroof mode by being moved into at least one open position, in a lengthwise direction of the vehicle and relative to roof parts lying laterally and to the rear with respect to said at least one roof cover part, a rear roof part of which is attached to lateral roof parts and the rear and lateral roof parts being fixed at least in said sunroof mode, and which can be opened to provide a convertible roof opening by moving of all of the roof parts and the at least one roof cover part into a storage space in a rear part of the vehicle, the improvement wherein the rear roof part is mounted in a pivotable manner relative to lateral columns on which it is supported; wherein lateral columns on which the rear roof part is supported are movable in the lengthwise direction of the vehicle on approximately horizontal guideways fixed on a body of the vehicle and are mounted in a manner enabling a forward and downward swinging of the columns and rear roof part into the storage space.

2. Vehicle roof according to claim 1, wherein said at least one movable roof cover part is a cover of a spoiler sunroof.

3. Vechicle roof according to claim 1, wherein the roof has a rear window which is mounted to the roof for movement under the rear roof part by a drive means for opening the rear window while the vechicle roof remains in said sunroof mode.

4. Vehicle roof according to claim 1, wherein the rear roof part forms a subassembly with said lateral roof parts.

5. Vehicle roof according to claim 1, wherein triangular windows with a frame part fastened on an upper edge thereof are arranged between a rear window and said lateral columns, said triangular windows being mounted in a manner enabling each window to be lowered at a respective outer side of the storage space.

6. Vehicle roof according to claim 5, wherein the roof has a rear window which is mounted to the roof for movement under the rear roof part by a drive means for opening the rear window while the vehicle roof remains in said sunroof mode.

7. Vehicle roof according to claim 1, wherein at least one covering is provided for covering said storage space from above.

\* \* \* \* \*